United States Patent
P et al.

(10) Patent No.: US 11,188,924 B2
(45) Date of Patent: Nov. 30, 2021

(54) CONNECTIVITY INTERFACE OPTIMIZATION RECOMMENDATION ENGINE FOR ENTERPRISE SYSTEM

(71) Applicant: SAP SE, Walldorf (DE)

(72) Inventors: Meenakshi Sundaram P, Walldorf (DE); Mayank Tiwary, Rourkela (IN); Pritish Mishra, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/662,267

(22) Filed: Oct. 24, 2019

(65) Prior Publication Data

US 2021/0125189 A1 Apr. 29, 2021

(51) Int. Cl.
*G06Q 30/00* (2012.01)
*G06N 5/02* (2006.01)
*G06N 5/04* (2006.01)
*G06N 20/00* (2019.01)

(52) U.S. Cl.
CPC .......... *G06Q 30/016* (2013.01); *G06N 5/027* (2013.01); *G06N 5/043* (2013.01); *G06N 20/00* (2019.01)

(58) Field of Classification Search
CPC ........ G06N 5/027; G06N 5/043; G06N 20/00; G06N 5/025; G06N 3/0427; G06Q 30/016
See application file for complete search history.

(56) References Cited

U.S. PATENT DOCUMENTS

| | | | | |
|---|---|---|---|---|
| 2010/0027552 A1* | 2/2010 | Hill | .................. | G06F 21/53 370/401 |
| 2012/0078727 A1* | 3/2012 | Lee | .................. | G06Q 30/02 705/14.66 |
| 2012/0124211 A1* | 5/2012 | Kampas | .................. | H04L 67/10 709/226 |
| 2013/0254405 A1* | 9/2013 | Nadaf | .................. | H04L 41/0823 709/226 |
| 2014/0279201 A1* | 9/2014 | Iyoob | .................. | G06F 9/5077 705/26.7 |
| 2015/0288569 A1* | 10/2015 | Agarwal | .................. | H04L 41/0886 709/224 |
| 2016/0034835 A1* | 2/2016 | Levi | .................. | H04L 67/10 705/7.23 |

* cited by examiner

*Primary Examiner* — Thomas J Dailey
(74) *Attorney, Agent, or Firm* — Buckley, Maschoff & Talwalkar LLC

(57) ABSTRACT

Some embodiments may be provided for an enterprise associated with on-premise systems and cloud-based computing applications. A plurality of on-premise collector agents may each execute between an on-premise system and a collector system server. A plurality of cloud collector agents may each execute between a cloud-based computing application and the collector system server. A collector and optimization framework, executing on the collector system sever, may collect connectivity interfaces data from the on-premise and cloud collector agents and store the collected connectivity interfaces data in a local data store. The stored connectivity interfaces data may then be automatically analyzed to generate an optimization recommendation for an enterprise landscape. The collector and optimizer framework may then transmit information about the optimization recommendation to a user via a User Interface ("UI") application.

20 Claims, 12 Drawing Sheets

CONNECTIVITY INTERFACE OPTIMIZATION RECOMMENDATION ENGINE FOR ENTERPRISE SYSTEM

BACKGROUND

Real world business processes typically require integration between various business systems both inside and outside of an enterprise. Some of these business processes may span across multiple systems throughout an on-premise and on-demand systems in a heterogeneous network. Because of this, there may be a need for next-generation connectivity interfaces optimization (both on-premise and on-demand) over the network. Integration across boundaries of on-premise and on-demand systems may, for example, help prevent applications silos. Moreover, such optimization may improve the user experience (by providing data quality and/or consistency between different systems), generate revenue, and/or improve customer experiences by creating a more connected world.

The complicated nature of business processes can lead to difficulties when integrating multiple systems, some of which may be point-to-point (which can make maintenance very complex). The data replication can be hard to control and lead to data quality issues in multiple systems of an enterprise network. This can also lead to slower software deployments and increase the time need to complete mergers and acquisitions. The typical system landscape is not scalable, does not provide flexibility for new system integrations, and can increases the Total Cost of Ownership ("TCO").

Note that there may be multiple legacy business processes in an enterprise that involve several people or teams within the organization, so there may be a need to separate tasks between systems. For example, an on-premise system may be deployed at company headquarters while on-demand systems are deployed at subsidiaries (and the same data may be processed by different users in the on-demand and on-premise systems). As a result, it can be difficult to ensure data quality and consistency between the systems. Moreover, different people or teams may create and/or edit similar business transaction documents in different on-premise and on-demand systems in the enterprise network. Changes in one document, however, should be automatically synchronized to other associated documents in a bidirectional way via the appropriate interfaces. In addition, conflicts can arise when multiple users are changing related documents at the same time.

Understanding and optimizing interfaces between systems in an enterprise IT landscape, however, can be a time consuming, expensive, and error prone task—especially when a substantial number of interfaces are involved. Some of the difficulties may include, for example, the fact that knowledge about essential interfaces is centrally accessible, interfaces lists may be incomplete, and no graphical representation of enterprise topology may be available. Moreover, there may be issues in compliance and risk assessment, impacts arising from unknown connections, some configuration and interfaces may be completely unused, and the impact of changes to end-to-end business processes can be hard to predict because of interface issues. Further, the system may be missing end-to-end interface monitoring tools across systems/tenants, resulting in a complex and poorly understood enterprise system landscape. The lack of a unified data governance process may result in increased TCO, increased timeframes for merger and acquisitions, slower and costly deployments, non-managed data replication, etc. There may also be stability issues arising from uncontrolled historical growth, a current landscape may not be scalable despite business demand, there may be a substantial data footprint and redundancy problems, data governance may be incomplete or siloed, disruptions due to data discrepancies between on-premise and cloud systems may be experiences, etc.

It would be desirable to facilitate connectivity interfaces optimization recommendations in a secure, automatic, and accurate manner.

SUMMARY

Methods and systems may be provided be for an enterprise associated with on-premise systems and cloud-based computing applications. A plurality of on-premise collector agents may each execute between an on-premise system and a collector system server. A plurality of cloud collector agents may each execute between a cloud-based computing application and the collector system server. A collector and optimization framework, executing on the collector system sever, may collect connectivity interfaces data from the on-premise and cloud collector agents and store the collected connectivity interfaces data in a local data store. The stored connectivity interfaces data may then be automatically analyzed to generate an optimization recommendation for an enterprise landscape. The collector and optimizer framework may then transmit information about the optimization recommendation to a user via a user interface application.

Some embodiments comprise: means for collecting, by a collector and optimizer framework executing at a collector system server, connectivity interfaces data from on-premise collector agents, each on-premise collector agent executing between an on-premise system and the collector system server; means for collecting, by the collector and optimizer framework, connectivity interfaces data from cloud collector agents, each cloud collector agent executing between a cloud-based computing application and the collector system server; means for storing the collected connectivity interfaces data in a local data store; means for automatically analyzing the stored connectivity interfaces data to generate an optimization recommendation for an enterprise landscape; and means for transmitting information about the optimization recommendation to a user via a user interface application.

Some technical advantages of some embodiments disclosed herein are improved systems and methods to facilitate connectivity interfaces optimization recommendations in a secure, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
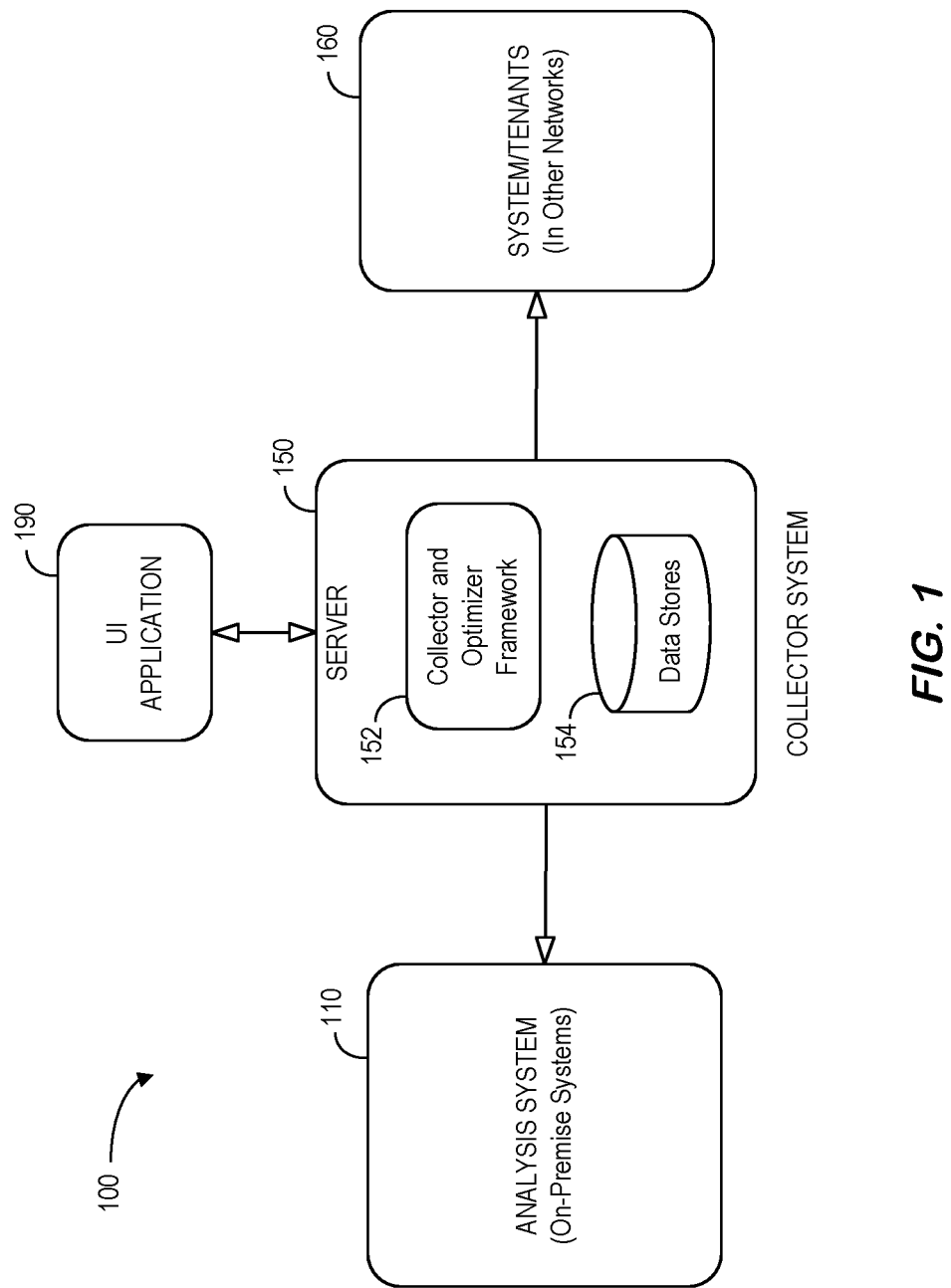
FIG. 1 is a high-level block diagram of a system in accordance with some embodiments.

According to some embodiments, an architecture is provided to help avoid data inconsistency and allow for data integration and governance in connection with other systems in the enterprise landscape. Moreover, embodiments may help maintain the needed data quality and data integrity and also let interfaces associated with multiple systems may be automatically scanned and optimized to avoid network congestion and throttling. Thus, some embodiments described herein facilitate connectivity interfaces optimization recommendations for an enterprise Information Technology ("IT") landscape. For example, FIG. 1 is a block diagram of a system 100 according to some embodiments. In particular, the system 100 includes an interfaces collector system server 150 that executes a collector and optimizer framework 152. The interfaces collector system server 150 may, according to some embodiments, automatically determine optimization recommendations for an analysis system 110 (e.g., associated with on-premises systems) and other system and tenants 160 (e.g., in other networks). As used herein the term "automatically" may refer to a process that is performed with little or no human intervention. The interfaces collector system server 150 might be, for example, associated with a Personal Computers ("PC"), laptop computer, an enterprise server, a server farm, and/or a database or similar storage devices.

As used herein, devices, including those associated with the interfaces collector system server 150 and any other device described, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The interfaces collector system server 150 may store information into and/or retrieve information from databases, such as data store 154. The databases might be, for example, locally stored relational database or reside physically remote from the interfaces collector system server 150. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical operator interface may provide an ability to access and/or modify elements of the system 100 via a User Interface ("UI") application 190. The operator interface might, for example, let an operator or administrator review statistics or errors, initiate or pause an optimization or report process, etc.

Note that any number of interfaces collector system servers 150 could be included in the system 100. Moreover, various devices described herein might be combined according to embodiments of the present invention. For example, in some embodiments, the interfaces collector system server 150 and UI application 190 might be co-located and/or may comprise a single apparatus. Moreover, the functions described herein might be implemented in a cloud-based environment and/or by a service provider (e.g., performing services for one or more enterprises, departments, or businesses).

Figure 2:
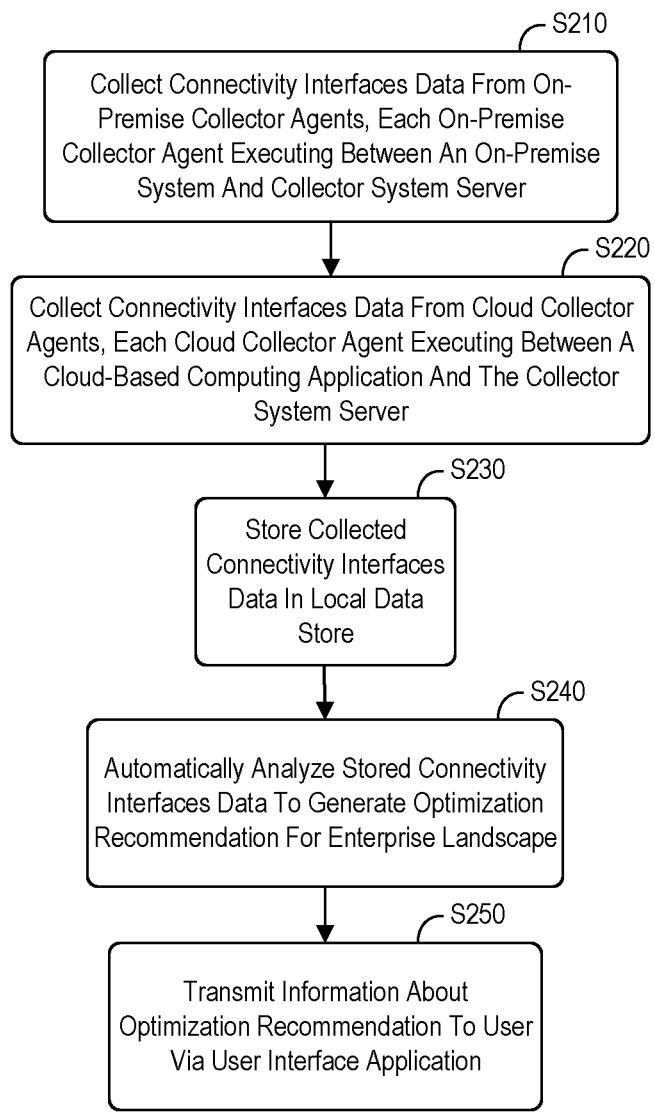
FIG. 2 is a method according to some embodiments.

FIG. 2 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, the system may collect (e.g., by a collector and optimizer framework executing at a collector system server) connectivity interfaces data from on-premise collector agents. Each on-premise collector agent may, for example, execute between an on-premise system and the collector system server. At S220, the system may collect (e.g., by the collector and optimizer framework) connectivity interfaces data from cloud collector agents. Each cloud collector agent may, for example, execute between a cloud-based computing application and the collector system server.

At S230, the system may store the collected connectivity interfaces data in a local data store. The system may then automatically analyze the stored connectivity interfaces data to generate an optimization recommendation for an enterprise landscape at S240. At S250, the system may transmit information about the optimization recommendation to a user via a User Interface ("UI") application.

Figure 3:
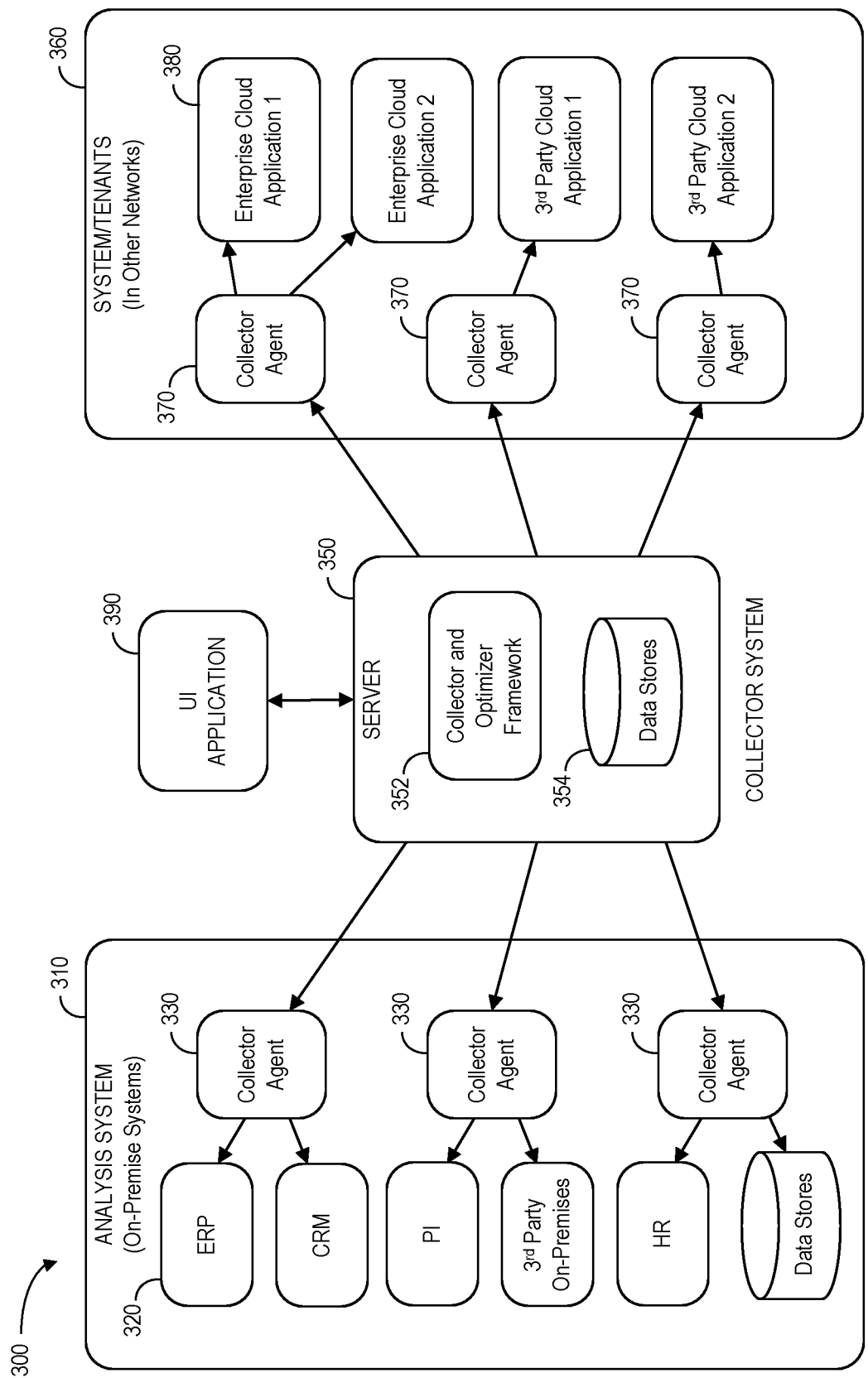
FIG. 3 is a more detailed system architecture in accordance with some embodiments.

FIG. 3 is a more detailed system 300 architecture in accordance with some embodiments. As before, the system 300 includes an interfaces collector system server 350 that executes a collector and optimizer framework 352. The interfaces collector system server 350 may, according to some embodiments, automatically determine optimization recommendations for an analysis system 310 associated with on-premises systems 320. The on-premises systems 320 might include, for example, an Enterprise Resource Planning ("ERP") system, a Customer Relationship Management ("CRM") system, a Process Integration ("PI") system, a third-party on-premises system, a Human Resources ("HR") system, data stores, etc. According to some embodiments, collecting agents 330 deployed in the analysis system 310 are used to collect information about the interfaces of the on-premises systems 320.

The interfaces collector system server 350 may also, according to some embodiments, automatically determine optimization recommendations for other systems and/or tenants 360 associated with other networks 380. The other networks 380 might include, for example, enterprise cloud applications and/or third-party cloud applications. According to some embodiments, collecting agents 370 deployed in the other networks and/or tenants 360 are used to collect information about the interfaces of the other networks. As used herein, devices, including those associated with the interfaces collector system server 350 and any other device described, may exchange information via any communication network.

The interfaces collector system server 350 may store information into and/or retrieve information from databases, such as an on-premises data store and/or data store 354. According to some embodiments, a graphical operator interface may provide an ability to access and/or modify elements of the system 300 via a UI application 390. The operator interface might, for example, let an operator or administrator review statistics or errors, initiate or pause an optimization or report process, etc.

According to some embodiments, the backbone for this approach is a UI and the data model in the NETWEAVER® system which gets interface and connectivity data from other systems like CRM, Supply Chain Management ("SCM"), ERP, Supplier Relationship Management ("SRM"), etc. via a collector optimizer framework interface. The setup in the IT environment may include the collector system 350, different analysis systems 310 to scan all the inbound and outbound interfaces of a specific system. This scans all the interface types like Remote Function Call ("RFC"), Application Link Enabling ("ALE"), Web Service ("WS"), Database Connection ("DBCon"), Open Data ("oData") protocol, PI proxy services, data integration interfaces such as SAP® Landscape Transformation ("SLT"), data services, Smart Data Access ("SDA"), Smart Data Integration ("SDI"), etc.

The collector and optimizer framework 352 may be based on loose coupling, metadata driven design, event driven approach, and/or a publish-subscribe architecture. It may provide agile data provisioning by supporting relational, hierarchical, flat files, big data sources (e.g., Hive), log based, semi-structured, and/or unstructured formats with all provisioning styles (batch, real-time, federation, event-based, etc.). The collector and optimizer framework 352 may understand and provide different data formats including Intermediate Documents ("IDocs"), XML, OData, JavaScript Object Notation ("JSON"), flat files, Simple Object Access Protocol ("SOAP"), etc. According to some embodiments, it may scalable and flexible for integrating new and third-party systems (e.g., on-premise, on-demand) and databases. The collector and optimizer framework 352 may provide interface data governance with end-to-end data management services along with end-to-end monitoring, support, triggering, tracking, and logging capabilities.

All of the different systems (including on-demand and on-premise) may be loosely coupled by using synchronous or asynchronous communication. The interfaces which is created in different on-premise and on-demand systems are sent to the collector system 350. Such a framework 352 may allow for the configuration of systems for every interface and the rules applicable for every interface. Options may be provided to configure different rules based on different source systems for the same interface.

The discovery and optimizer framework may work with data from one or more systems. In other cases, a discovery may require specialized information that needs to be collected within a system database. The collection process typically has some overhead associated with performance and consumes memory. The collection should be enabled only if the overhead is needed for optimization. Users should be able to control which collector agents 330, 370 are enabled and estimate their impact via the UI application 390.

According to some embodiments, the relationship between collector agents 330, 370, discovery, and optimizer is many-to-many. For example, there may different collector agents 330, 370 for different systems and the system 300 may monitor data relevant to multiple discoverers and/or different optimizers.

For a specific kind of collector agent 330, 370, there might be only a single global session for the entire system. Often, collector agents 330, 370 may directly view sensitive information about the different interfaces or workloads, or in some cases the collected information may be used to infer sensitive information. For these reasons, turning a collector agent 330, 370 on or off may require a relatively high level of privilege. Similarly, accessing the collected data directly may require a relatively high privilege level. Even though collection is global to the system 300, collector agents 330, 370 may offer a way to filter their overhead to particular interfaces of interest (for example, interfaces identified by a specific system, interface type, interface categorization, etc.).

An optimizer may implement a mechanism to make recommendations based on observations of different system interfaces workload. Depending on the type of optimizer, interfaces data from different collector agents 330, 370 will be needed, and these collector agents 330, 370 may be enabled before using the optimizer so that there are enough observations to make informed recommendations. For many optimizers, a long history may be important to make appropriate recommendations that work well for day-to-day operations as well as month-end and quarter-end use cases. Collector agents 330, 370 might, therefore, provide mechanisms to store the collected data persistently. When an optimizer runs, it may read the data from one or more collector agents 330, 370. The result of an optimizer may comprise a set of recommendations. Each recommendation might include, for example:

an explanation "why" the recommendation is made to the extent possible;
    falsifiable predictions of what is expected if the recommendation is followed (expressed in a manner that can be automatically evaluated);
    an estimate of a cost of executing the provided recommendations; and/or
    an estimate of an improvement in performance and/or fulfillment cost if the suggested recommendation is implemented.

The recommendations from the optimizer may be persisted in a base table along with the predictions used to assess the quality of the prediction. There may also be a mechanism to avoid generating the same recommendations in future sessions if the underlying system and/or workload have not changed. In some embodiments, a mechanism may be provided for a user to prevent a recommendation from being offered again even if the workload and/or data have changed. According to some embodiments, a customer may choose which recommendations will be applied. The optimizer may arrange the recommendations in a way such that each subset of recommendations can be applied independently. After a user chooses the recommendations to apply, the optimizer may execute the proposed tasks and report the progress. The progress and success of applying the needed changes may be, for example, reflected in the base table row associated with the recommendation.

After a recommendation has been successfully applied, the optimizer may record that information. There may be a common way to monitor the status of all collector agents 330, 370. Moreover, there might be a common syntax used by all collector agents 330, 370 to turn collection on or off with options. Options common among multiple optimizers may be treated in a consistent way while also supporting collector-specific options. The collector agent 330, 370 might also support independent sessions from different users. The optimizer may return a set of independent recommendations where any subset can be applied. The optimizer's recommendations might, for example, describe why the change is recommended and also provide falsifiable assertions that can be used to test the soundness of the recommendation.

Initially, the collector and optimizer framework 352 running on the collector system 350 server may run periodically (to collect features and/or metrics and trigger a rule-based engine) to figure out when the enterprise network needs a performance optimization recommendation. When the collector and optimizer framework 352 detects that optimization may be required, it can collect the particular period data from the different connected systems using the different collector agents 330, 370. Note that there may be multiple collector agents 330, 370 managed and controlled by the collector and optimizer framework 352. According to some embodiments, all of the different connected collector agents 330, 370 may be configured and customized in the collector optimizer framework 352. An adapter framework in a collector agent 330, 370 may host the different adapters that may be needed to communicate with the respective systems, tenants, and/or databases in the enterprise network landscape.

According to some embodiment, a collector agent 330, 370 may perform authentication via different technical users for the respective systems, tenants, and/or databases and execute the data formatting as needed for the collector system 350 server. The collector agent 330, 370 may perform data aggregation if needed based on aggregation logic. The aggregated data from the different data sources may then be sent to the collector system 350 server to be housed in the data store 354 for further analysis and generation of an optimization recommendation. The collector and optimizer framework 352 might, according to some embodiments, use different Machine Learning ("ML"), Deep Learning ("DL"), and/or Neural Network ("NN") algorithms to do workload classification, performance bottleneck identification, generate performance recommendations, etc. Based on the existing interfaces data, the optimizer framework may perform enterprise network workload forecasting also along with identification of new features associated with the data arriving from different systems (to make better network optimization recommendations). In some embodiments, feature extraction may be initially done based on the existing data, but additional features might be added in an ongoing basis based on the new interface data from different systems, databases, tenants, etc. to improve network optimization recommendations. According to some embodiments, cleaning of existing features may also be performed (based on background jobs) when a feature not used for a pre-determined period of time based on a configuration setting in the framework.

New network optimization recommendations may be initially checked against a rule-based engine for testing. A final recommendation may then be presented to the user. If a new network optimization recommendation is failed by the rule engine, then the rule may be replaced and/or a new rule may be added. After validation, the newly obtained recommendations may be stored in a data repository in the collector server system. When the network optimization recommendation is executed in the needed specific systems via the collector agent 330, 370 (using the necessary adapters in the adapter framework). Based on the current workload and workload forecasting, the collector and optimizer framework 352 can also add additional threads needed for parallel processing and/or arrange offset pointer handling for failover situations during data transfer.

The collector agent 330, 370 may utilize an adapter framework that interacts with different types of systems using different adapters either in the application layer or in the database layer (based on the configuration in the collector and optimizer framework 352). Note that there may be multiple collector agents 330, 370 which are coordinated by the collector and optimizer framework 352 in the collector system 350 server. The adapter framework may, for example, host different adapters which can interact with different databases versions, different database vendors, different data and interface formats, etc.

The different interfaces data may be visualized in the UI application 390 on behalf of the application user. The collector system 350 server may utilize its own data store 354 where it stores the interface data from multiple systems in the enterprise IT system landscape.

According to some embodiments, there may be multiple periodic background jobs that are run by the different collector agents 330 on the different analysis systems 310 which may help retrieve the changed (or delta) or newly created interfaces on a regular basis. This information may be stored the same in the collector system 350 server for detailed analysis. Note that collector agents 370 may be installed across different networks in different data centers for interface data retrieval. This may improve the performance and avoid the issues associated with to network latency.

In some embodiments, the interface data may be retrieved from different analysis systems 310 using a technical user which has the right authorizations to read the data and send the same back to collector system 350 for further analysis. The collector system 350 may, for example, make a remote call to the different analysis systems 310 using that technical user to collect data. The collector and optimizer framework 352 can control the access rights of different technical users in the different analysis systems 310 using different variant configurations to perform the remote calls.

Each analysis system 310 may have the needed technical profiles and associated technical user to communicate with the collector system 350 via the collector and optimizer framework 352. The configuration and customizations options in the framework 352 may indicate whether the remote calls to the analysis system 310 will be in the application layer or in the database layer. The user may configure the data exchange between the collector and analysis system using the framework in terms of batches for initial and delta load. The system may also configure the needed threads for parallel processing, handling error conditions, exceptions, offset pointer handling for failover situations during data transfer, having tracking mechanism using staging tables, etc. According to some embodiments, monitoring capabilities may be provided in this framework to give full transparency about data movement between different systems in the landscape.

Thus, embodiments may provide a framework based on loose coupling, metadata driven design, an event driven approach and/or a publish-subscribe architecture. Moreover, the system may provide agile data provisioning by supporting relational, hierarchical, flat files, big data sources (e.g., Hive), log based, semi-structured, and/or unstructured formats with all multiple provisioning styles (e.g., batch, real-time, federation, and event-based). Embodiments may understand and provide different data formats (e.g. IDocs, XML, OData, JSON, flat files, SOAP, etc.) and scalable and flexible enough to integrate new enterprise and third-party systems (both on-premise and on-demand), databases, etc. Embodiments may provide interface governance with end-to-end data management services, provide end-to-end monitoring, triggering, tracking and logging capabilities, monitor and debug capabilities, configuration and administration service, metadata management, central logging, authorization management, central rules management, reporting and analysis capabilities, etc.

Figure 4:
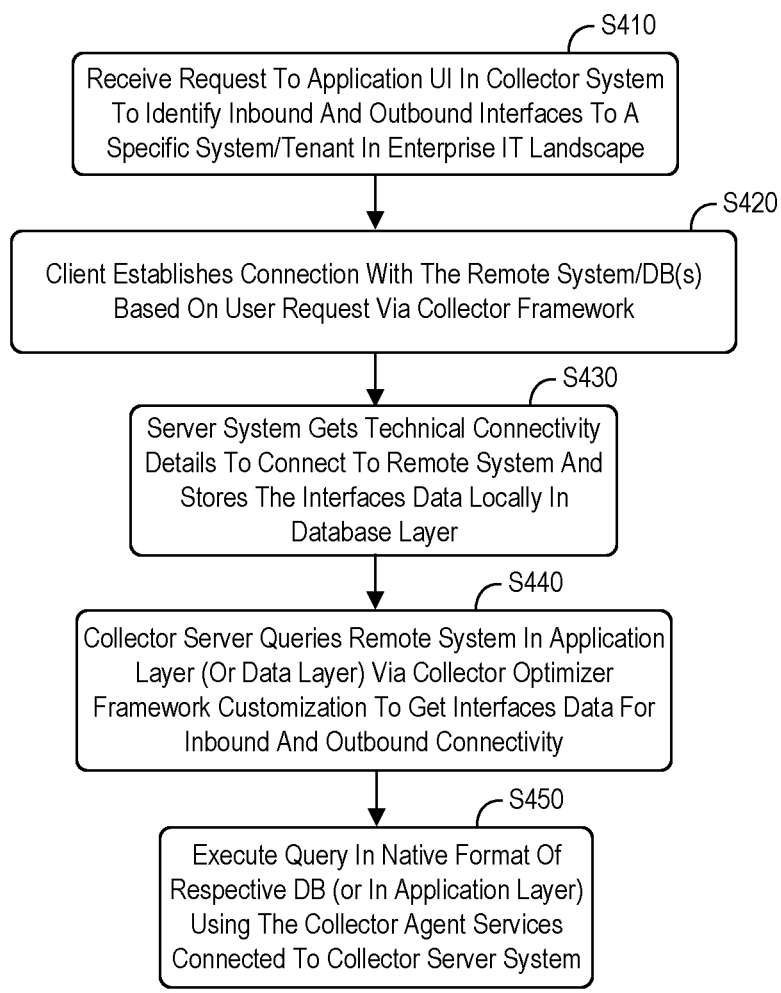
FIGS. 4 through 6 are connectivity interfaces optimization recommendation methods according to some embodiments.
Figure 5:
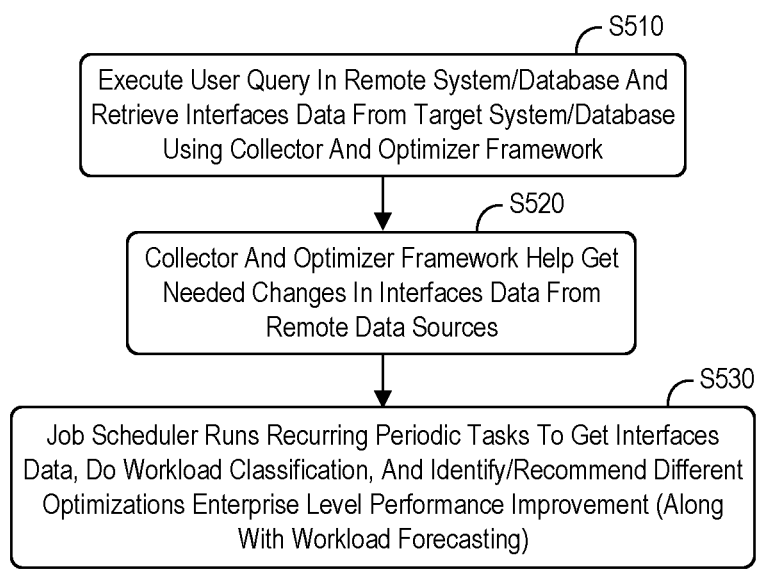
Figure 6:
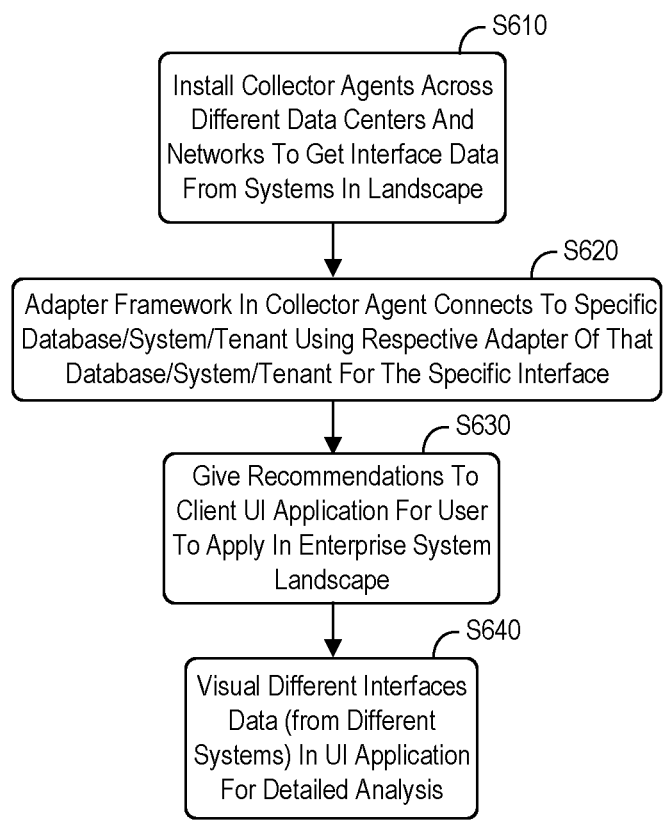

FIGS. 4 through 6 are connectivity interfaces optimization recommendation methods according to some embodiments. As shown in FIG. 4, at S410 the system may receive a request to an application UI in the collector system asking it to identify all inbound and outbound interfaces associated with a specific system/tenant in an enterprise IT landscape. At S420, the client may establish a connection via an application which in turn establishes a connection with the remote systems and/or database(s) based on the user request using the collector framework. Note that a user certificate may be created dynamically with a limited time validity to access the remote system and/or database(s) based on the user request. When it is an asynchronous request, they system may handle the request via a background job.

At S430, the server system may get the technical connectivity details to connect to the remote system using the technical user and store the interfaces data locally in the database layer. Note that the collector and optimizer framework may control the access rights of different technical users in different analysis systems using different variant configurations to do the remote calls. At S440, the collector server may query the remote system in the application layer (or in the data layer) via the collector optimizer framework customization to get the interfaces data for inbound and outbound connectivity (e.g., by doing a remote procedure call to the different targets).

At S450, the query may be executed in the native format of the respective database or in the application layer using the collector agent services which is connected to the collector server system. According to some embodiments, the system may configure the data exchange between the collector and analysis system using the framework in terms of batches for initial and delta load. Moreover, the system may configure the needed threads for parallel processing, handle error conditions, exceptions, offset pointer handling for failover situations during data transfer, implement a tracking mechanism using staging tables, etc.

As illustrated in FIG. 5, at S510 the user query may be executed in the remote system and/or database and it retrieves the interfaces data from the target system and/or database using the collector and optimizer framework (via the different collector agents). At S520, the collector and optimizer framework may help to get the needed changes in the interfaces data from the remote data sources. This may, for example, get the newly created and changed interfaces in a specific time period. If there are multiple target systems, the data may be collected from different systems and stored centrally in the collector server system for further analysis. Embodiments may provide an option to persist data and protect information from short-term outages of the target system.

At S530, the job scheduler may execute (in the collector optimizer framework) the recurring periodic tasks to get the interfaces data and do the workload classification. The system may also identify and/or recommend different optimizations needed for enterprise level performance improvements and forecast future workloads. Note that this component may use different ML, DL and/or NN algorithms for classification, performance bottleneck identification, performance recommendations, etc. Based on the result of step S530, the user may be advised with different sets of recommendations. The user may then execute the different recommendations to optimize the interfaces in the enterprise IT landscape. Note that there may be dependent and independent recommendations given for the optimization purposes.

As illustrated in FIG. 6, at S610 collector agents may be installed across different data centers and different networks to get the interface data from the different systems in the system landscape. This may help improve performance and avoid issues associated with network latency. According to some embodiments, multiple collector agents may be managed and controlled by the collector optimizer framework. Moreover, different connected collector agents may be configured and/or customized in the collector optimizer framework. At S620, the adapter framework in the collector agent may connect to the specific database, system, or tenant using the respective adapter of that database, system, or tenant for the specific interface. According to some embodiments, the adapter framework may host different adapter types and adapter versions which are needed to connect with different databases and systems to connect in the application or data layer.

At S630, the recommendations may be given to the client UI application for the user to apply the same in the enterprise system landscape. Note that the optimization recommendations may be centrally stored for the different databases, systems, and/or tenants in the data repository so that the recommendations may be improved based on the past learnings from different database vendors, versions, deployment modes, etc. At S640, the different interfaces data (from different systems) may be visualized in the UI application for detailed analysis.

The inbound and outbound connectivity interfaces of a system which is to be analyzed may be configured in the collector and optimizer framework of the collector system. The corresponding technical user which does the data retrieval may be created in the analysis system with specific needed authorizations. Embodiments may do the data retrieval using both the application layer and the data layer (tables, views, etc.) based on the analysis context. The data may be accessed and retrieved by the collector system based on a configuration in the collector and optimizer framework. The data may be stored in the database of the collector system for further analysis. The data may have the details about different types of interfaces for a specific system like RFC, ALE, DBCon, WS, oData, PI proxy services, data integration interfaces like SLT, data services, SDI, etc.

Figure 7:
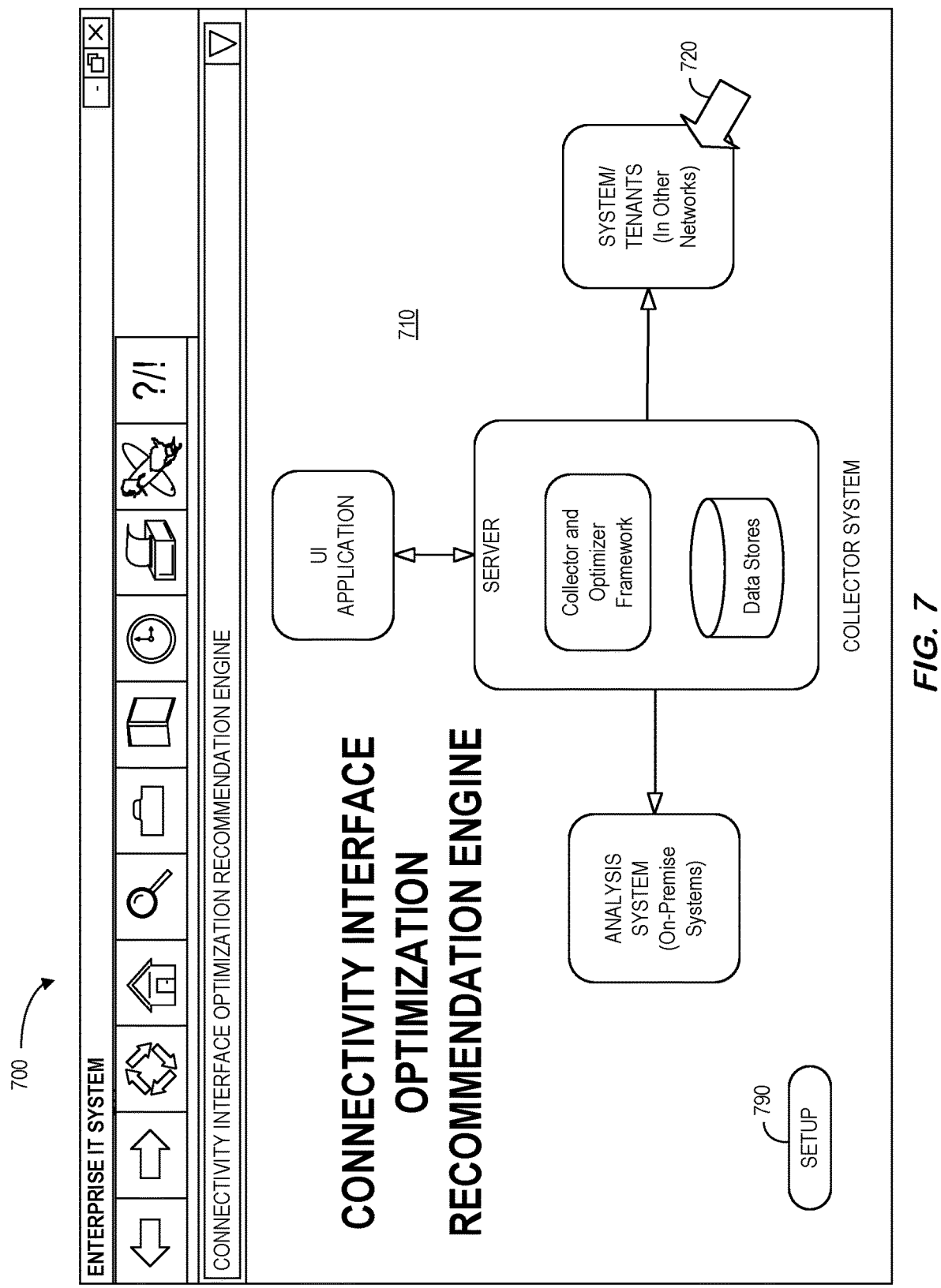
FIG. 7 is a human machine interface display according to some embodiments.

FIG. 7 is a human machine interface display 700 in accordance with some embodiments. The display 700 includes a graphical representation 710 of elements of a connectivity interface optimization recommendation engine. Selection of an element (e.g., via a touch-screen or computer pointer 720) may result in display of a pop-up window containing various options (e.g., to adjust rules or logic, turn on or off various collector agents, specific a particular tenant or interface type, etc.). The display 700 may also include a user-selectable "Setup" icon 790 (e.g., to configure parameters for a recommendation engine and/or to alter or adjust processes as described with respect any of the embodiments of FIGS. 1 through 6).

By collecting all the inbound and outbound interfaces connectivity data, a UI can display the top three communication systems (or the top ten percent) with the specific analysis system and the different load patterns that are created by them during different time intervals. The UI can also identify newly created or discovered interfaces during a user-defined specific time period (and the interfaces that were not used during that time period. Embodiments may also help a user understand the newly connected systems and/or hosts within the time period.

Figure 8:
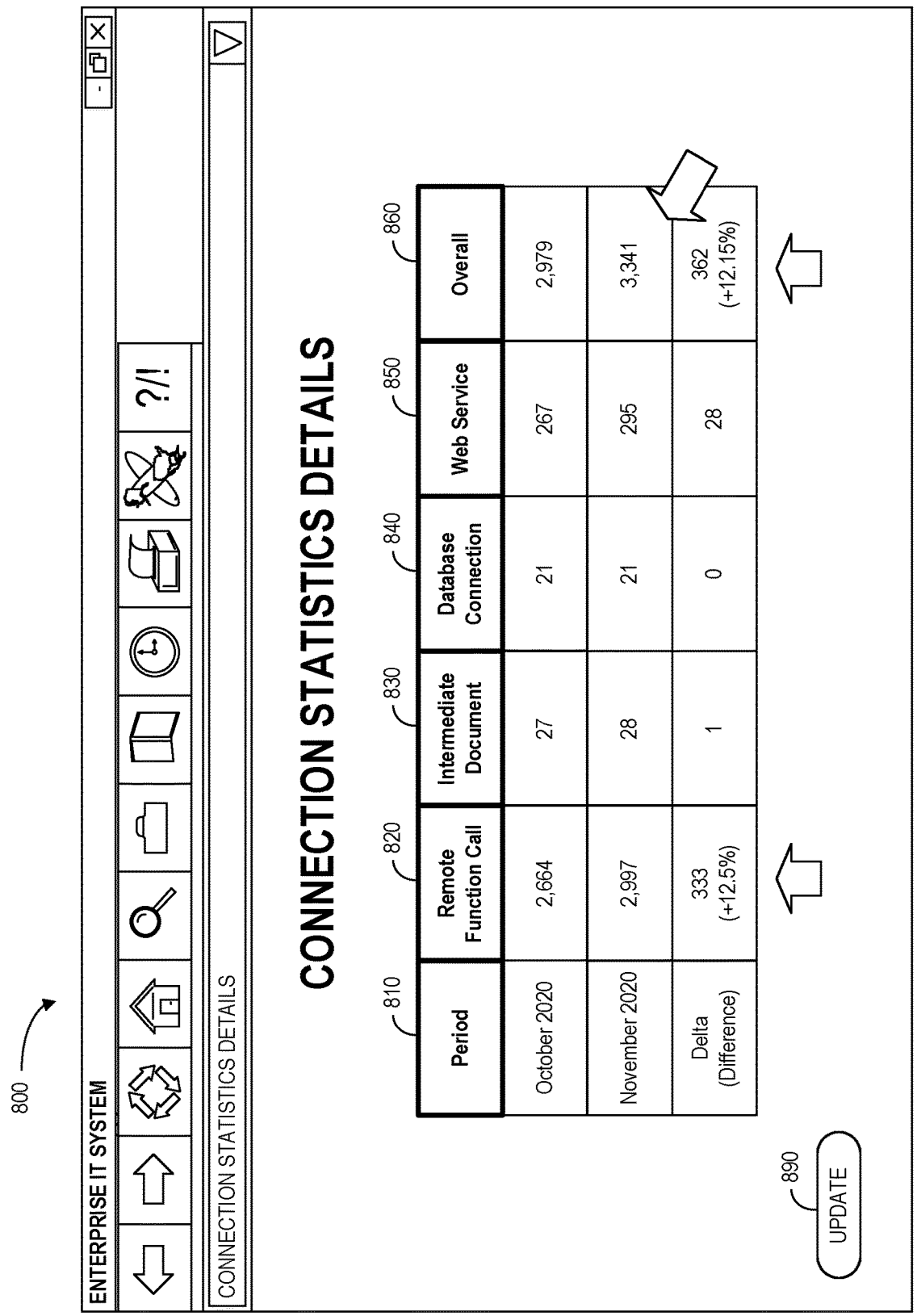
FIGS. 8 and 9 are statistic detail displays in accordance with some embodiments.

FIG. 8 is a connection statistics details display 800 in accordance with some embodiments. The display 800 includes a table showing remote function calls 810, intermediate documents 830, database connections 840, web services 850, and overall activity 860 for various time periods 810 (which might have been, for example, specified by a user). In the example of FIG. 8, the table shows the interface data collected during two particular months and how the connections have changed between those months (along with a graphical arrow denoting the change). An "Update" icon 890 may be used to refresh the display 800 data and/or to define new time periods.

Figure 9:
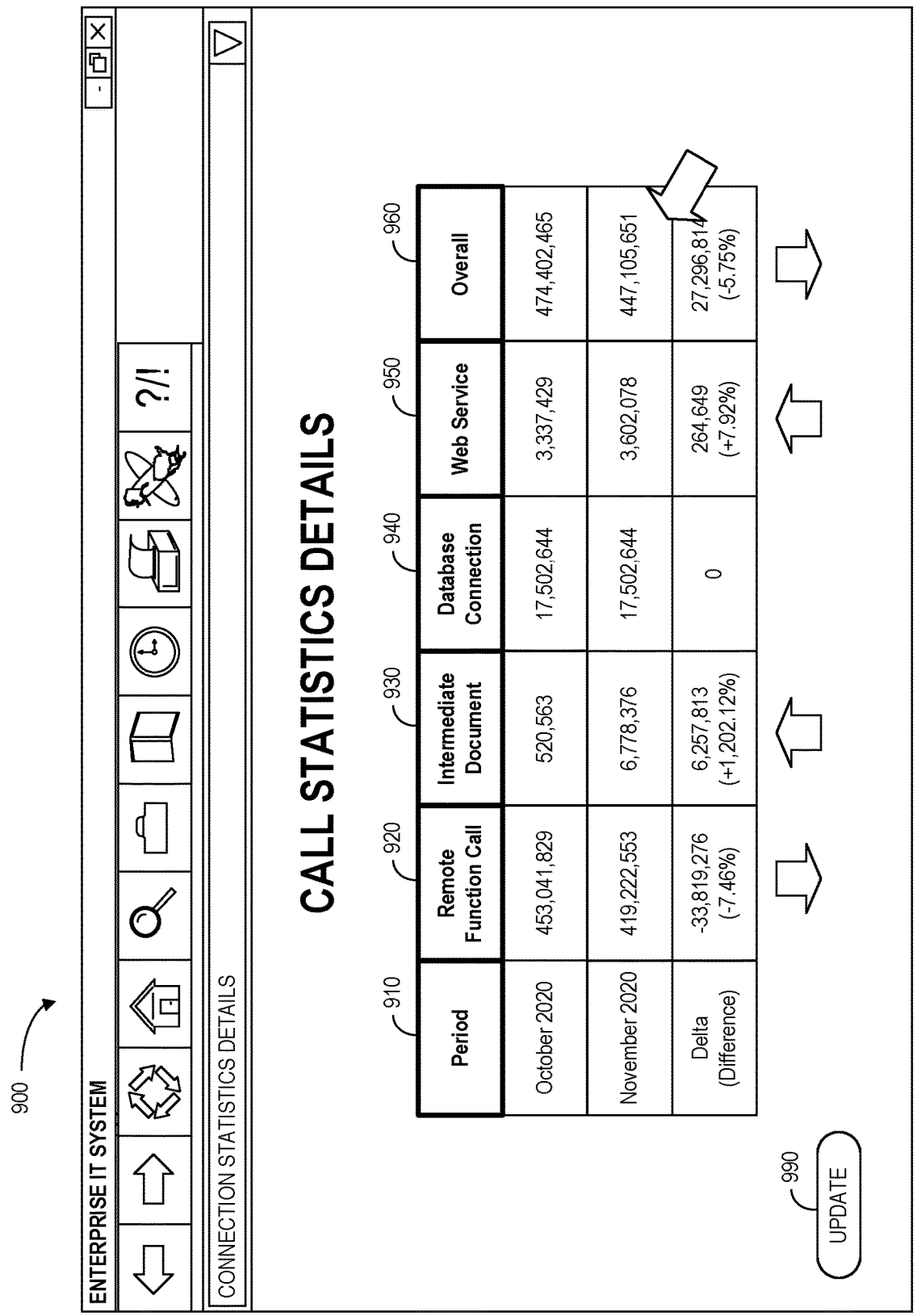

FIG. 9 is a call statistics details display 900 in accordance with some embodiments. The display 900 includes a table showing remote function calls 920, intermediate documents 930, database connections 940, web services 950, and overall activity 960 for various time periods 910 (which might have been, for example, specified by a user). In the example of FIG. 9, the table shows the interface data collected in those two months and the interfaces call statistics, along with how the interfaces calls have increased or decreased during that time. An "Update" icon 990 may be used to refresh the display 900 data and/or to define new time periods.

The described solution using the collector and optimizer framework may provide a scalable architecture for on-demand and on-premise systems and seamless integration in an enterprise network. Embodiments may help streamline interface governance processes and thereby provide operational excellence. It may reduce the data load across an entire system landscape. Some embodiments may help integrate new systems in a limited timeframe for merger and acquisitions and shorten time-to-market, Embodiments may also be helpful when an on-premise system is deployed in the headquarters of a company while on-demand systems are deployed in subsidiaries (and the same data is processed by different users in the on-demand and on-premise systems). Common needs among different optimizers may be met with similar user interfaces (instead of a variety of distinct parameters and/or procedures). Some embodiments may provide a path towards a grand unified optimizer that can optimize multiple characteristics holistically.

Some of the benefits that might be provided by embodiments described herein may include user friendliness, an increase growth and/or scale, a reduction in the time to impact revenue, an increase of business growth, an increase in productivity, an increase in efficiency and quality, etc. Embodiments may also offer a user better insights about inbound and outbound interfaces associated with a specific system and/or tenant in an IT enterprise landscape. The collector and optimizer framework may provide clear operational reporting for systems (about inbound and outbound connectivity), interface types, interface categorization, help a user discover and visualize all existing interfaces, provide central reporting repository for all interfaces in the enterprise IT landscape along with a graphical representation of system topology. Embodiments may support compliance and risk assessment and predict the impact of changes to end-to-end business processes (including planning and execution). Some embodiments may automate compliance and security, operational support and monitoring of interfaces, reduce system outages and downtime by identifying resource bottlenecks and overheads, and support intrusion avoidance and detection by eliminating unused connections and interfaces. In some embodiments, an option may be provided to identify top used interfaces, unused connections and unused interfaces, etc., to avoid unnecessary system calls and reduce network traffic in the IT landscape, improve the system performance by reducing the unwanted interface calls, and/or identify unused connections and interfaces to a specific system and flag them for potential decommissioning.

Some of the features that might be supported by embodiments described herein may include automatic data collection and filtering, diverse options for configuration, analysis and visualization, a consistent user experience, role-based, regionalized, personalized, extended system integration with sap and third-party systems (both cloud and on-premise), etc. Other features may include enhanced identity management (with accurate permissions and authorizations), support for various interaction levels, continuous and automated analysis of interfaces in it system landscape, an ability to obtain a connection overview with all business systems (inbound and outbound), tenants, host servers, etc. (via the specific interface type such as RFC, ALE, WS, DBCon, PI based systems, etc.) to a specific system/tenant in the given time period, identifying all sender and receiver interface details along with the number of calls made, message size, etc., identify the different types of unused connections for RFC, DBCon, WS, etc., a drill down view of all the different calls (like RFC, PI, IDOC, WS, DBCon, etc.) made in a given time period with different systems, tenants in the enterprise IT landscape, a drill down view of all the different interfaces called within different systems, tenants in the given time period, options to check top used interfaces, unused destinations, unused connections and unused interfaces, etc. Embodiments may also provide an ability to obtain inbound and outbound call statistics for all different interface types, identify the top connected systems which is generating the workload to a given specific system via different connected interfaces along with the interface types and details, identify the new connections created in a specific time period, identify the new systems, hosts connected in a specific time period, etc.

Figure 10:
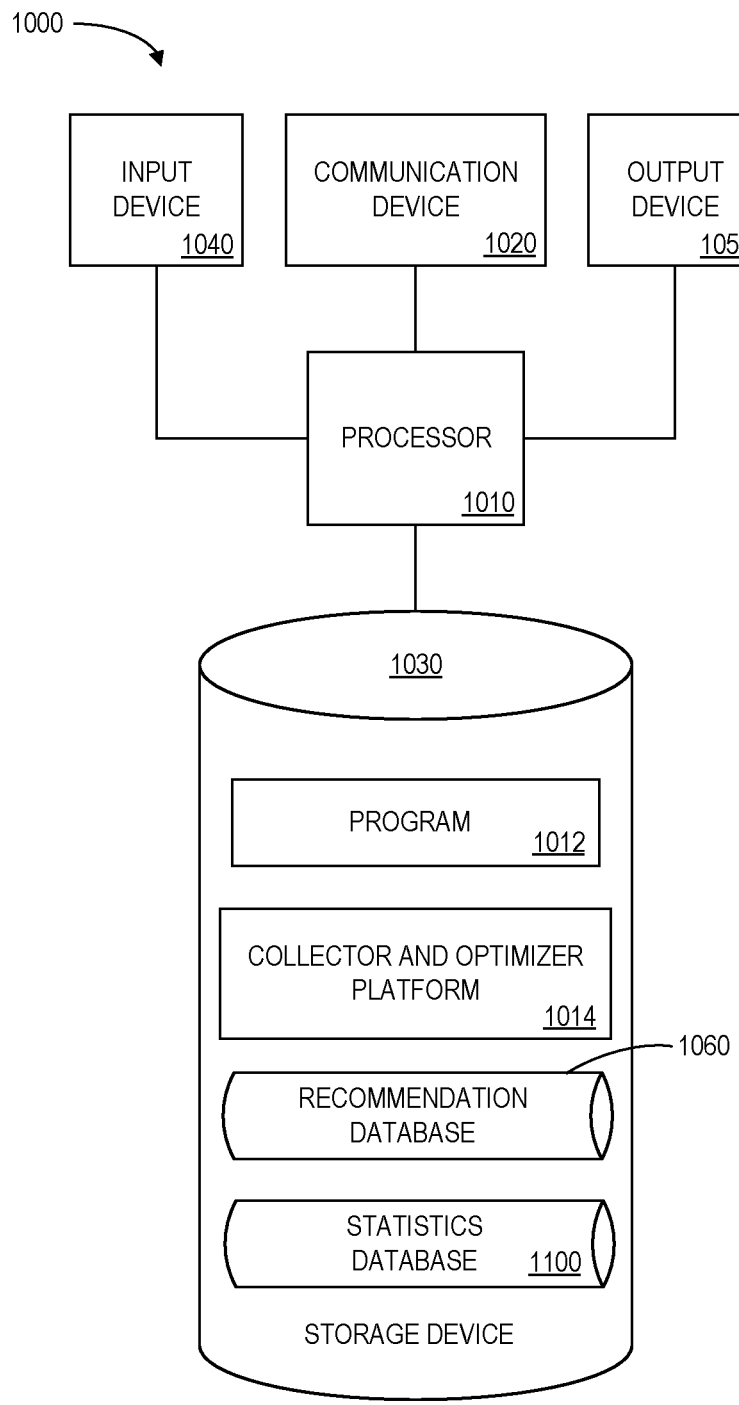
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the system 300 of FIG. 3 (and/or any other system described herein). The platform 1000 comprises a processor 1010, such as one or more commercially available CPUs in the form of one-chip microprocessors, coupled to a communication device 1020 configured to communicate via a communication network (not shown in FIG. 10). The communication device 1020 may be used to communicate, for example, with one or more remote user platforms, on-premises systems, cloud resource providers, etc. The platform 1000 further includes an input device 1040 (e.g., a computer mouse and/or keyboard to input rules or logic) and/an output device 1050 (e.g., a computer monitor to render a display, transmit recommendations, and/or create enterprise IT system reports). According to some embodiments, a mobile device and/or PC may be used to exchange information with the platform 1000.

The processor 1010 also communicates with a storage device 1030. The storage device 1030 can be implemented as a single database or the different components of the storage device 1030 can be distributed using multiple databases (that is, different deployment information storage options are possible). The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or a collector and optimizer platform 1014 for controlling the processor 1010. The processor 1010 performs instructions of the programs 1012, 1014, and thereby operates in accordance with any of the embodiments described herein. For example, the processor 1010 may collect connectivity interfaces data from the on-premise and cloud collector agents and store the collected connectivity interfaces data in a local data store. The stored connectivity interfaces data may then be automatically analyzed by the processor 1010 to generate an optimization recommendation for an enterprise landscape. The processor 1010 may then transmit information about the optimization recommendation to a user via a UI application.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores a recommendation database 1060 (e.g., storing optimized connectivity suggestions to improve an enterprise IT landscape) and a statistics database 1100 (e.g., to support a UI application). An example of a database that may be used in connection with the platform 1000 will now be described in detail with respect to FIG. 11. Note that the database described herein is only one example, and additional and/or different information may be stored therein. Moreover, various databases might be split or combined in accordance with any of the embodiments described herein.

Figure 11:
FIG. 11 illustrates a connectivity interfaces optimization recommendation engine database in accordance with some embodiments.

Referring to FIG. 11, a table is shown that represents the statistics database 1100 that may be stored at the platform 1000 according to some embodiments. The table may include, for example, entries identifying various connectivity interfaces data for an enterprise IT landscape. The table may also define fields 1102, 1104, 1106, 1108, for each of the entries. The fields 1102, 1104, 1106, 1108 may, according to some embodiments, specify: a time period 1102, remote function calls 1104, intermediate documents 1106, and database connections 1108. The statistics database 1100 may be created and updated, for example, based on collected and locally stored connectivity interfaces data, etc. According to some embodiments, the statistics database 1100 may further store details about web services, overall statistics, deltas or differences between time periods 1102, etc.

The time period 1102 might be a unique alphanumeric label or link that is associated with a particular period of time that an enterprise IT landscape is being monitored and/or analyzed. The remote function calls 1104, intermediate documents 1106, and database connections 1108 may represent data was collected about those types of connectivity interfaces during the time period 1102. This information may be used, for example, to create a UI application for a user and/or to make optimization recommendations (e.g., suggesting that unused types of connectivity interfaces be decommissioned).

Thus, embodiments may provide a unified design and architecture across applications, making it easier to use and maintain, consistent across applications in different enterprise and third-party systems, be performance optimized, and allow for the reuse of existing values. Moreover, embodiments may provide a scalable architecture for on-demand and on-premise systems for seamless integration, streamline interfaces governance processes (operational excellence and efficiency), and allow for managed data replication between different systems in the enterprise IT landscape. Some embodiments may also provide reduced time frame for merger and acquisitions, deliver faster and cheaper deployments, allow for landscape simplification, leverage common technical infrastructure, reduce point-to-point communications, reduce data replication times, reduce system landscape complexity (making it easier to maintain), and introduce substantial system landscape simplification by eliminating unwanted interfaces. In addition, embodiment may provide higher flexibility and scalability, lower TCO and low risk, avoid unnecessary data replication, data uploads, provide a unified interface governance process across the entire enterprise IT landscape and ensure data quality. Some embodiments may allow for unified interface reporting, reduced data load across the entire system landscape, improved user simplicity, the easy integrated of new systems in a limited timeframe for merger and acquisition and shorten time-to-market, speed time-to-insight and action by allowing business users to directly access, manage, and visually interact with business data, provide a single source of truth, full transparency on data movements, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
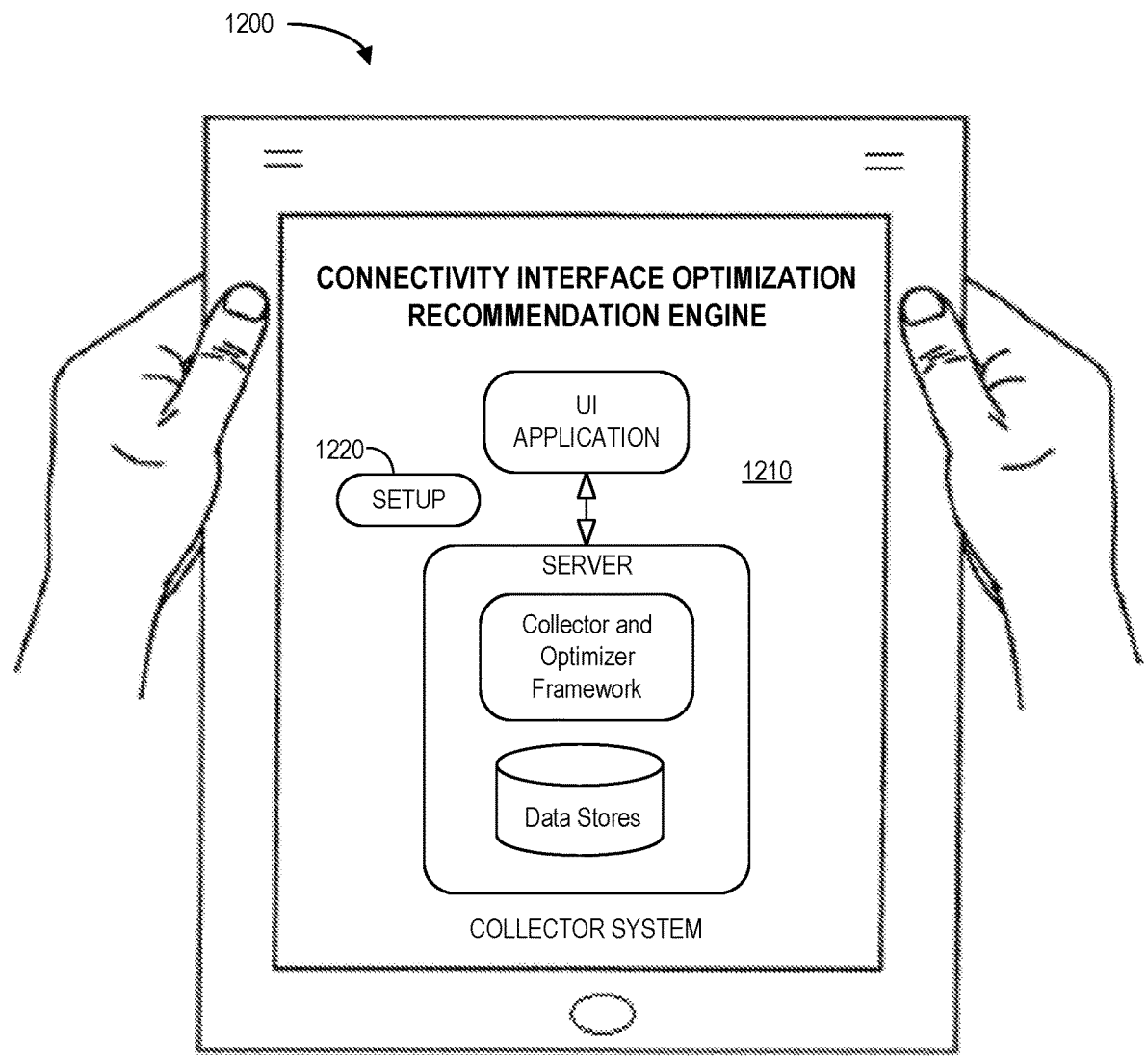
FIG. 12 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. For example, FIG. 12 shows a tablet computer 1200 rendering a connectivity interfaces optimization recommendation engine display 1210. The display 1210 may, according to some embodiments, be used to view more detailed elements about components of the system (e.g., when a graphical element is selected via a touchscreen) or to configure operation of the system (e.g., to establish new rules or logic for the system via a "Setup" icon 1220).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system for an enterprise associated with on-premise systems and cloud-based computing applications, comprising:
    a collector system server;
    a plurality of on-premise collector agents, each on-premise collector agent executing between an on-premise system and the collector system server;
    a plurality of cloud collector agents, each cloud collector agent executing between a cloud-based computing application and the collector system server, wherein different cloud-based computing applications are associated with different tenants of the enterprise; and
    a collector and optimization framework, executing on the collector system server, including:
        a local data store,
        a computer processor, and
        a computer memory storing instructions that, when executed, cause the computer processor to:
            (i) collect connectivity interfaces data from the on-premise and cloud collector agents,
            (ii) store the collected connectivity interfaces data in the local data store,
            (iii) automatically analyze, using machine learning via a neural network analysis, the stored connectivity interfaces data to generate an optimization recommendation for an enterprise landscape, the optimization recommendation comprising one or more falsifiable predictions of an expected result if the optimization recommendation is implemented,
            (iv) transmit information about the optimization recommendation to a user via a User Interface ("UP") application,
            (v) persist the optimization recommendation and the one or more falsifiable predictions in a base table, and
            (vi) initiate display, via the UI application, of one or more newly created or discovered interfaces from the connectivity interfaces data, the one or more newly created or discovered interfaces being identified during a user-specified time period.

2. The system of claim 1, wherein at least one on-premise system is associated with at least one of: (i) an enterprise resource planning system, (ii) a customer relationship management system, (iii) a process integration system, (iv) a third-party on-premises system, (v) a human resources system, and (vi) an on-premise data store.

3. The system of claim 1, wherein at least one cloud-based computing application is further associated with at least one of: (i) an enterprise cloud application, (ii) a third-party cloud application, and (iii) a database.

4. The system of claim 1, wherein at least some of the collected connectivity interfaces data includes information about: (i) inbound network traffic, (ii) outbound network traffic, (iii) a remote function call, (iv) application link enabling, (v) a web service, (vi) database connection, (vii) an open data protocol, (viii) process integration proxy services, (ix) data integration interfaces, (x) data services, (xi) smart data access, (xii) smart data integration, (xiii) a number of calls made, and (xiv) a message size.

5. The system of claim 1, wherein at least one on-premises or cloud collector agent includes an adapter framework that includes a plurality of adapters able to interact with different database version, different database vendors, or different data and interface formats.

6. The system of claim 1, wherein the collector and optimizer framework is associated with at least one of: (i) loose coupling, (ii) a metadata driven design, (iii) event driven design, and (iv) a publish-subscribe architecture.

7. The system of claim 1, wherein the automatic analysis is further associated with at least one of: (i) a pre-determined period of time, (ii) a user defined parameter, and (iii) deep learning.

8. The system of claim 1, wherein the collector and optimizer framework is associated with at least one of: (i) relational data, (ii) hierarchical data, (iii) flat files, (iv) big data sources, (v) log-based data, (vi) semi-structured data, and (vii) unstructured data formats.

9. The system of claim 1, wherein the collector and optimizer framework are further configured to automatically identify unused destinations, connections, or interfaces.

10. The system of claim 1, wherein the collector and optimizer framework are further configured to automatically forecast a future workload.

11. The system of claim 1, wherein the collector and optimizer framework communicates with on-premise and cloud collector agents via a technical user having an appropriate technical user profile and privileges.

12. The system of claim 1, wherein the collector and optimizer framework includes at least one of: (i) an end-to-end monitoring capability, (ii) a triggering capability, (iii) a tracking capability, (iv) a logging capability, (v) a monitoring capability, (vi) metadata management, and (vii) reporting and analysis capabilities.

13. The system of claim 1, wherein the user can activate or deactivate individual on-premise and cloud collector agents via the UI application.

14. The system of claim 1, wherein the optimization recommendation further includes: (i) an explanation why the recommendation is appropriate, (ii) a cost estimate, and (iii) an improvement estimate.

15. The system of claim 14, wherein the collector and optimizer framework are further configured to automatically implement the optimization recommendation upon receiving an indication of approval from the user via the UI application.

16. A computer-implemented method for an enterprise associated with on-premise systems and cloud-based computing applications, comprising:
    collecting, by a collector and optimizer framework executing at a collector system server, connectivity interfaces data from on-premise collector agents, each on-premise collector agent executing between an on-premise system and the collector system server;
    collecting, by the collector and optimizer framework, connectivity interfaces data from cloud collector agents, each cloud collector agent executing between a cloud-based computing application and the collector system server, wherein different cloud-based computing applications are associated with different tenants of the enterprise;

storing the collected connectivity interfaces data in a local data store;

automatically analyzing, using machine learning via a neural network analysis, the stored connectivity interfaces data to generate an optimization recommendation for an enterprise landscape, wherein the optimization recommendation comprises one or more falsifiable predictions of an expected result if the optimization recommendation is implemented, the optimization recommendation and the one or more falsifiable predictions persisting in a base table;

transmitting information about the optimization recommendation to a user via a User Interface ("UP") application; and transmitting information about one or more newly created or discovered interfaces from the connectivity interfaces data, the one or more newly created or discovered interfaces being identified during a user-specified time period.

17. The system of claim 1, wherein at least one on-premise system is associated with at least one of: (i) an enterprise resource planning system, (ii) a customer relationship management system, (iii) a process integration system, (iv) a third-party on-premises system, (v) a human resources system, and (vi) an on-premise data store.

18. The method of claim 16, wherein at least one cloud-based computing application is further associated with at least one of: (i) an enterprise cloud application, (ii) a third-party cloud application, and (iii) a database.

19. A non-transitory, computer readable medium having executable instructions stored therein that, when executed by a computer processor cause the processor to perform a method for an enterprise associated with on-premise systems and cloud-based computing applications, the method comprising:

collecting, by a collector and optimizer framework executing at a collector system server, connectivity interfaces data from on-premise collector agents, each on-premise collector agent executing between an on-premise system and the collector system server;

collecting, by the collector and optimizer framework, connectivity interfaces data from cloud collector agents, each cloud collector agent executing between a cloud-based computing application and the collector system server, wherein different cloud-based computing applications are associated with different tenants of the enterprise;

storing the collected connectivity interfaces data in a local data store;

automatically analyzing, using machine learning via a neural network analysis, the stored connectivity interfaces data to generate an optimization recommendation for an enterprise landscape, wherein the optimization recommendation comprises one or more falsifiable predictions of an expected result if the optimization recommendation is implemented, the optimization recommendation and the one or more falsifiable predictions persisting in a base table;

transmitting information about the optimization recommendation to a user via a User Interface ("UP") application; and transmitting information about one or more newly created or discovered interfaces from the connectivity interfaces data, the one or more newly created or discovered interfaces being identified during a user-specified time period.

20. The medium of claim 19, wherein at least some of the collected connectivity interfaces data includes information about: (i) inbound network traffic, (ii) outbound network traffic, (iii) a remote function call, (iv) application link enabling, (v) a web service, (vi) database connection, (vii) an open data protocol, (viii) process integration proxy services, (ix) data integration interfaces, (x) data services, (xi) smart data access, (xii) smart data integration, (xiii) a number of calls made, and (xiv) a message size.

* * * * *